United States Patent [19]

Dönges et al.

[11] Patent Number: 4,979,681
[45] Date of Patent: Dec. 25, 1990

[54] PROCESS FOR GRINDING AND SIMULTANEOUS DRYING OF MOIST CELLULOSE ETHER PRODUCTS

[75] Inventors: Reinhard Dönges, Bad Soden; Manfred Sponheimer, Wiesbaden; Günther Welt, Gau-Bischofsheim; Manfred Ziegelmayer, Bischofsheim, all of Fed. Rep. of Germany

[73] Assignee: Hoechst Aktiengesellschaft, Fed. Rep. of Germany

[21] Appl. No.: 440,590

[22] Filed: Nov. 22, 1989

[30] Foreign Application Priority Data

Nov. 25, 1988 [DE] Fed. Rep. of Germany ....... 3839831

[51] Int. Cl.$^5$ .................................. B02C 19/12
[52] U.S. Cl. ........................................ 241/17; 241/23; 241/24; 241/27; 241/73
[58] Field of Search ............... 241/24, 18, 100, 80, 241/97, 28, 74, 189 R, 57, 85, 86.1, 87, 88.1, 89.3, 91, 17, 19, 23, 27, 73; 536/56, 86

[56] References Cited

U.S. PATENT DOCUMENTS 4,044,198  8/1977  Kostrzewa et al. .
4,076,935  2/1978  Eichenseer et al. .
4,415,124  11/1983  Carduck et al. .

FOREIGN PATENT DOCUMENTS 0049815  4/1982  European Pat. Off. .
0952264  11/1956  Fed. Rep. of Germany .
2458998  5/1976  Fed. Rep. of Germany .
2556821  11/1979  Fed. Rep. of Germany .
2410789  8/1980  Fed. Rep. of Germany .

Primary Examiner—Mark Rosenbaum
Attorney, Agent, or Firm—Connolly and Hutz

[57] ABSTRACT

The present invention relates to a process for careful grinding and simultaneous drying of moist cellulose ether products wherein a moist cellulose ether is introduced by means of a transport gas into a circular space. The moist cellulose ether is impact-comminuted while being circulated in that space, and the product is simultaneously friction-comminuted in a direction opposite to that of the impact comminution. The peripheral speed of the comminution stages, which operate in opposite directions, is regulated to such a value that the resulting grinding energy dries the product to a predetermined residual moisture content. The ground material is conveyed by the gas stream introduced into the comminution space, and the ground material is then separated from the gas stream. If desired, the ground material is subjected to selective screening.

12 Claims, 2 Drawing Sheets

PROCESS FOR GRINDING AND SIMULTANEOUS DRYING OF MOIST CELLULOSE ETHER PRODUCTS

Process and equipment for careful grinding and simultaneous drying of moist cellulose ether products The present invention relates to a process for careful grinding and simultaneous drying of moist cellulose ether products. The invention also relates to equipment suitable for carrying out the process.

After the reaction and, if appropriate, after the purification by removing by-products formed in the reaction, cellulose ethers are in the form of crumbly, lumpy, fibrous, woolly or wadding-like structure. In this form, they are not suitable for their use, for example as products soluble in organic and/or aqueous media.

It is also necessary to adjust to particle size distributions, degrees of drying and degrees of viscosity of the ethers for the various fields of use. Thus, for example, ethers in a fine or very fine disperse form are required to enable lump-free solutions, for example in water, to be prepared rapidly. For ethers which are rapidly swellable and which are required, for example, in the drilling oil industry or construction industry, the viscosity distribution and/or the particle size distribution of the products is of decisive importance for their effectiveness.

In principle, almost all cellulose ethers must therefore be ground and dried in order to make them usable.

Thus, DE-C No. 952,264 has disclosed a three-stage process for converting moist, fibrous methylcelluloses into powders of high dissolution rate. In this case, the product containing 50 to 70% by weight of water is first homogenized to give a plastic mass and then cooled to 10° to 20° C., a cooled screw press being used; this mass is then ground in a hammer basket mill and dried in a circulating-air dryer. DE-C No. 2,410,789 (=US-A No. 4,044,198) describes a process for the production of cellulose derivatives, preferably cellulose ethers, of high fines content. In this case, the moist cellulose derivatives are embrittled by means of liquid nitrogen and then subjected to grinding.

DE-B No. 2,458,998 (=US-A No. 4,076,935) and the application DE-B No. 2,556,821 in addition thereto relate to processes for fine-grinding of cellulose or derivatives thereof, in particular ethers, grinding of the product having a water content from 5 to 14% by weight being carried out until the particle size is at most 100 μm and the residual moisture content is at most 2 to 10 percent by weight. Vibratory mills are used for this purpose.

EP-A No. 0,049,815 (=US-A No. 4,415,124) describes a two-stage process for producing micropowders from cellulose ethers or cellulose, wherein the products having a fine-fibrous or woolly structure are first converted into an embrittled, consolidated form and the material thus pretreated is subjected to grinding until a particle size distribution of at least 90% below 125 μm is reached. Vibratory mills or ball mills, preferably in a cooled design, or pellet presses are used in the embrittlement stage, and jet mills, pin mills or impact disk mills are used in the grinding stage.

The majority of the known processes according to the state of the art are multi-stage with pre-drying or preembrittlement or pre-compaction, or they require a large provision of equipment, for example due to intensive cooling. Moreover, in all the processes, the chemical and/or thermal stress on the macromolecules, in particular when highly viscous, highly substituted products are processed, is always still so high that the macromolecules are degraded during grinding in the way of shortening the chains, and this manifests itself especially by the greater or lesser degradation of viscosity as compared with the feed products. In addition, the surfaces of the treated products become horny as a result of the pre-embrittlement steps or pre-drying steps, which undesirably manifests itself with respect to the properties of rapid and complete dissolution as required by the customer.

It is therefore the object of the invention to develop a simple process in which
controlled degrees of grinding can be set,
the products do not become horny,
only a small residual moisture content remains after grinding,
the bulk density of the product is increased and
above all, only a minimum degradation in viscosity or none at all as compared with the starting products takes place.

The object stated above is achieved by a process for simultaneous grinding and drying of moist cellulose ethers, wherein
(a) a moist cellulose ether is introduced by means of transport gas into a circular space,
(b) the moist cellulose ether is impact-comminuted while being circulated,
(c) the product is simultaneously friction-comminuted in the direction opposite to that of the impact-comminution,
(d) the peripheral speed of the comminution stages, which operate in opposite directions, being regulated to such a value that the resulting grinding energy dries the product to a predetermined residual moisture content,
(e) the ground material is conveyed onwards by the gas stream introduced into the comminution spaces,
(f) the ground material is separated from the gas stream, and if desired,
(g) the ground material is subjected to selective screening.

Preferably, the process is carried out in such a way that the peripheral speed is adjusted to 60 to 80 m/second in the impact-comminution and to 25 to 35 m/second in the friction-comminution.

The temperature, which is generated by the comminution operating in opposite directions and which serves for drying the moist starting material, and/or the moisture content required to prevent overdrying of the material are preferably assisted or controlled by temperature adjustment and/or moistening of the transport gas, this temperature adjustment and/or moistening being matched to the desired residual moisture content of the end product.

Temperature adjustment is here to be understood as either additional heating or precooling of the transport gas.

Within the scope of the process according to the invention, provision is also made for influencing the temperature and the moisture content of the ground material by temperature adjustment within the comminution spaces or from the outside. This can be done by heating or cooling of individual units, for example of the ball of the housing surrounding the comminution spaces.

Within the process, provision is preferably made for screening off oversizes of the ground material going beyond a predetermined range and, after screening-off and, if appropriate, after moistening, adding it to the charge material. This can be done batchwise, but is preferably carried out continuously. Preferably, the impact comminution is effected by means of a beater wheel rotating in a housing, and the friction comminution is effected by means of a screened basket which is provided with friction segments and perforated metal friction sheets and rotate in the opposite direction.

Within the scope of the process, cellulose ethers are preferably used which have an initial moisture content of 20 to 70% by weight. In particular, the impact comminution and friction comminution, with the temperature adjustment and/or moistening additionally used if desired, is adjusted such that the end product has a residual moisture content of 1 to 10% by weight. By means of the process according to the invention, in principle all cellulose ethers can be ground and simultaneously dried in one stage. The process is applied with particular advantage to methylhydroxyalkylcelluloses, such as methylhydroxyethylcelluloses and methylhydroxypropylcelluloses, or mixed ethers, and here especially to those of high viscosity from 50,000 up to more than 100,000 mPas, measured in a 1.9% aqueous solution.

The products, in particular the high-viscosity products, show only an extremely small degradation of viscosity or none at all after grinding and drying, as compared with the starting products, in contrast to those which were ground and dried according to the state of the art. In this connection, reference is made to the examples and tables following later.

In principle, it is sufficient to carry out the grinding process according to the invention only once. However, in order to achieve an extremely fine particle size, it can sometimes be appropriate to carry out the grinding and drying step several times, preferably in continuous operation. In many cases, a second pass is normally sufficient to obtain products of very fine particle size.

The invention also relates to equipment for carrying out the process, this comprises
(a) a housing 1,
(b) a beater wheel 2 arranged concentrically therein and provided with a plurality of beater rods 3,
(c) a screen basket 4 which is arranged concentrically to the beater wheel 2 and has sawtooth segments 5 arranged sectionally one after the other on the periphery and metal friction sheets 6 provided with openings,
(d) known devices for driving the shaft 7, 8, to which the beater wheel 2 and the screen basket 4 respectively are connected, in opposite directions, and
(e) an inlet opening 9, fitted in the housing, for introducing the material which is to be ground and dried, and for introducing the transport gas, and
(f) a discharge opening 10, fitted in the housing, for the ground and dried material and also for the transport gas.

The material charged is impact-comminuted by the beater rods of the beater wheel and friction-comminuted by the screen basket which is provided with the friction segments and perforated metal friction sheets (called "friction sheets" below) and is driven in the direction opposite to that of the beater wheel.

The sawtooth segments consist of screen basket sections provided with teeth, and the sawtooth lengths in combination with the friction sheets can be selected in various lengths or close spacings depending on the desired friction comminution. The teeth preferably have a length of 1 to 10 mm.

The friction sheets are arranged alternating with the friction segments in the screen basket. Friction sheets are sheets in which orifices, preferably of trapezoidal form, have been made by oblique punching and which have teeth projecting to one side (FIG. 3). They preferably have an opening from 0.12 to 0.8 mm in longitudinal direction and a gap width likewise from 0.12 to 0.8 mm, especially from 0.15 to 0.5 mm.

The screen basket has in general diameters from 500 to 1,500 mm in widths from 100 to 700 mm.

The peripheral speeds of the beater wheel and of the screen basket, driven in the opposite direction, are preferably adjusted such that they are 60 to 80 m/second and 25 to 35 m/second respectively. This adjustment is made by means of the particular drive unit connected to the drive shafts.

In principle, the material to be ground and to be dried can be introduced into the equipment in the lumpy, woolly, flaky, granular or cake-like form of defined moisture content, in which it is obtained.

The temperature generated in the equipment by matching the rotational speeds of beater wheel and screen basket and by the choice of design of the friction segments and friction sheets as well as the distance of the beater wheel from the screen basket is, in interaction with the temperature of the transport gas, normally sufficient to obtain a predetermined degree of grinding and a defined residual moisture content. The distance between the beater wheel (edge of the beater rod) and the screen basket (upper tooth edge of the friction sheet or tooth of the sawtooth segment) is 1 to 10 mm, preferably 2 to 4 mm.

For selective control, it is advantageous in some cases to provide known devices, by means of which the transport gas can be temperature-adjusted and/or moistened. Temperature adjustment is here to be understood—depending on the desired purpose—either as heating or as cooling. For the purpose of adjusting the temperature for the treatment of the material, it is also possible to provide temperature adjustment for the housing and/or the beater wheel and/or the screen basket.

For the housing, either passing the liquids or gases in a temperature-adjusted form through channels made in the housing or electric heating are possible. For the beater wheel and/or the screen basket, heating can be provided, for example, via sliding contacts.

Devices for screening, in order to enable defined particle sizes to be screened off, are advantageously provided downstream of the grinding and drying equipment.

The oversize, normally arising in relatively small quantities, going beyond a predetermined particle size or particle size distribution is preferably returned to the charge material by means of devices known per se. Since this material has normally already been dried to a low residual moisture content, renewed moistening is preferably carried out before return into the circulation, in order to prevent this product fraction from becoming horny or from suffering a degradation of viscosity.

The process and the equipment according to the invention have proved particularly suitable in the grinding and drying of preferably high-viscosity cellulose ethers. Methylhydroxyalkylcelluloses of high viscosity such as, for example, methylhydroxyethylcellulose and methylhydroxypropylcellulose, mixed ethers, carboxymethylcellulose and hydroxyethylcellulose, can be particularly well processed in this way. The process and equipment according to the invention are not in principle restricted to high-viscosity products and can also be applied to medium-viscosity and low-viscosity ethers, where good grinding and drying is important, without a degradation of viscosity taking place.

In the following examples, assembled in the form of tables, the grinding and drying according to the invention of cellulose ethers in a single-stage procedure are described, but without this being intended to be a restriction to the embodiments shown.

grinding and drying for producing particularly fine-grained product, none of the cellulose ether samples showed any degradation of viscosity.

Figure 1:
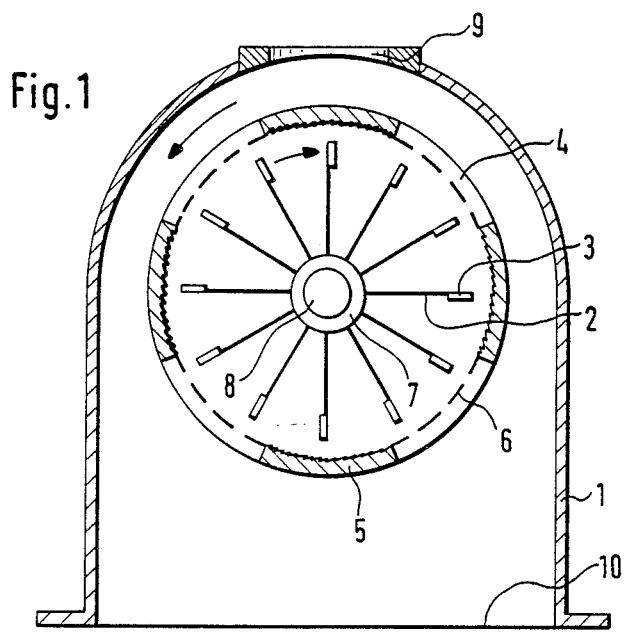
FIG. 1 shows the basic apparatus for the impact/friction comminution operation.

The equipment according to the invention and possible process procedures are explained in more detail by the figures which follow, here again no restriction to

TABLE I

| Example | Ether | Initial consistency | Friction sheet mm | Throughput kg/h | Moisture Initial % by weight | Moisture Residual % by weight | Viscosity Initial mPas in 1000 | Viscosity Final | Bulk density Initial g/l | Bulk density Final | Air temperature In °C. | Air temperature Out °C. |
|---|---|---|---|---|---|---|---|---|---|---|---|---|
| +1 | MHEC | woolly | 0.5 | 209.0 | 23.5 | 11 | >160 | >160 | 125 | 257 | 16 | 28.5 |
| +2 | MHPC | woolly | 0.3 | 37.2 | 35.0 | 3.5 | >140 | >140 | 307 | 523 | 16 | 44.3 |
| +3 | MHPC | lumpy | 0.5 | 68.0 | 22.5 | 9.5 | 0.16 | 0.16 | 340 | 499 | 17 | 56 |
| +4 | MHPC | lumpy | 0.3 | 75.0 | 27.3 | 7.5 | 92 | 91.9 | 382 | 500 | 16 | 38 |
| +5 | MHEC | flaky | 0.3 | 48.0 | 39.0 | 3.0 | >170 | >170 | 295 | 496 | 16 | 55 |
| +6 | MHEC | woolly | 0.2 | 19 | 64.0 | 7.0 | >200 | >200 | 153 | 264 | 18 | 70 |
| 7 | HEC | granular | 0.5 | 143 | 36.0 | 7.5 | 58 | 57.9 | 242 | 282 | 22.2 | 50.0 |
| 8 | CMC | granular | 0.5 | 109 | 40.1 | 15.9 | >100 | >100 | 427 | 534 | 22.2 | 48.0 |

Rotational speeds: beater wheel 2,400 min$^{-1}$
screen basket 1,000 min$^{-1}$
screen basket 4 × 2.5 mm sawtooth
beater wheel with 16 beater rods Air throughput (when idling) with friction sheets:
0.5 mm  29.7 m$^3$/min
0.3 mm  23.8 m$^3$/min
0.2 mm  23.7 m$^3$/min The abbreviations have the following meanings: MHPC = methylhydroxypropylcellulose, MHEC = methylhydroxyethylcellulose, HEC = hydroxyethylcellulose, CMC = carboxymethylcellulose.
The viscosities are determined in a 1.9% aqueous solution (5% in the case of CMC) using a Hoppler falling-ball viscometer. As the tests showed, no degradation of viscosity was observed in the process according to the invention - within the range of measurement accuracy.

The tests marked with + were repeated on a vibratory mill with recycling circulation according to the state of the art. In this case, the following results were obtained:

TABLE II

| Test | Starting material | Viscosity Initial mPas in 1000 | Viscosity Final | Bulk density Initial g/l | Bulk density Final | Residual moisture % by weight | Throughput kg/h |
|---|---|---|---|---|---|---|---|
| A | as 1 | >150 | 120 | 125 | 214 | 1.5 | 4.6 |
| B | as 2 | >140 | 37 | 307 | 379 | 3.3 | 2.8 |
| C | as 3 | 0.16 | 0.15 | 340 | 362 | 1.8 | 1.0 |
| D | as 4 | 92 | 40 | 382 | 406 | 1.0 | 2.0 |
| E | as 5 | >170 | 96.4 | 295 | 332 | 3.5 | 4.0 |

Test B was repeated, but with the difference that cold grinding according to the state of the art was carried out in place of vibratory mill grinding. In this case, the MHPC used in test 2 and having an initial viscosity of >140,000 mPas was, in spite of cooling of the starting material with liquid N$_2$ to −170° C., degraded to a final viscosity of 106,000 mPas after the grinding according to the state of the art. The throughput was here 7 kg/hour.

The tests thus clearly show that, by means of the process and equipment according to the invention, even high-viscosity cellulose ethers, above all those above 50,000 mPas and especially above 100,000 mPas, can be ground to a predetermined particle size and dried, without an undesired degradation of viscosity taking place or the product becoming horny, the bulk density also being raised in a desired manner. Even with repeated the embodiments shown being intended.

FIG. 1 shows a basic representation of impact/friction comminution in a diagrammatic illustration in side view and in section. A beater wheel 2 driven via a shaft 8 by devices not shown is arranged in the housing 1, beater rods 3 being pressed on the ends of the beater arms. The screen basket 4, arranged concentrically to the beater wheel 2, is fixed to a shaft 7 which drives the screen basket in the direction opposite to that of the beater wheel by means of devices not shown. Sawtooth segments 5 and friction sheets 6 provided with openings are located sectionally in the screen basket. The material and the transport gas are introduced into the equipment through the inlet opening 9 and discharged via the opening 10.

Figure 2:
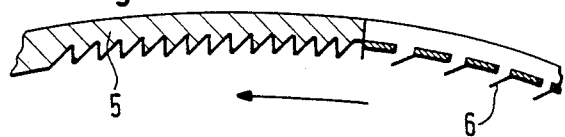
FIG. 2 shows a part section of the screen basket.

FIG. 2 shows, in section and in side view, a part detail of the screen basket 4 with sawtooth segment 5 and friction sheet 6.

Figure 3:
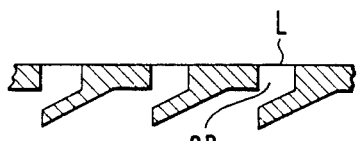
FIG. 3 shows a part section of the friction sheet.

FIG. 3 shows a part section of a friction sheet in side view. L is here the length of the opening and SP is the gap width between the lower edge of the screen basket and the upper edge of the friction tooth.

Figure 4:
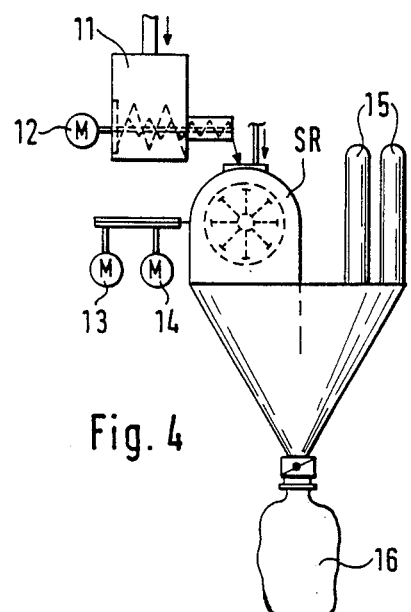
FIG. 4 shows a unit for single grinding and drying.

FIG. 4 shows a diagrammatic illustration of a unit for single grinding and drying.

The material is introduced into the equipment SR, as shown in FIG. 1, by means of the metering device 11 driven by the motor 12, and is ground and dried therein. The motors 13 and 14 drive the shafts 7 and 8 in opposite directions. The material is collected in the container 16. The filters 15 serve for purifying the escaping gas stream.

Figure 5:
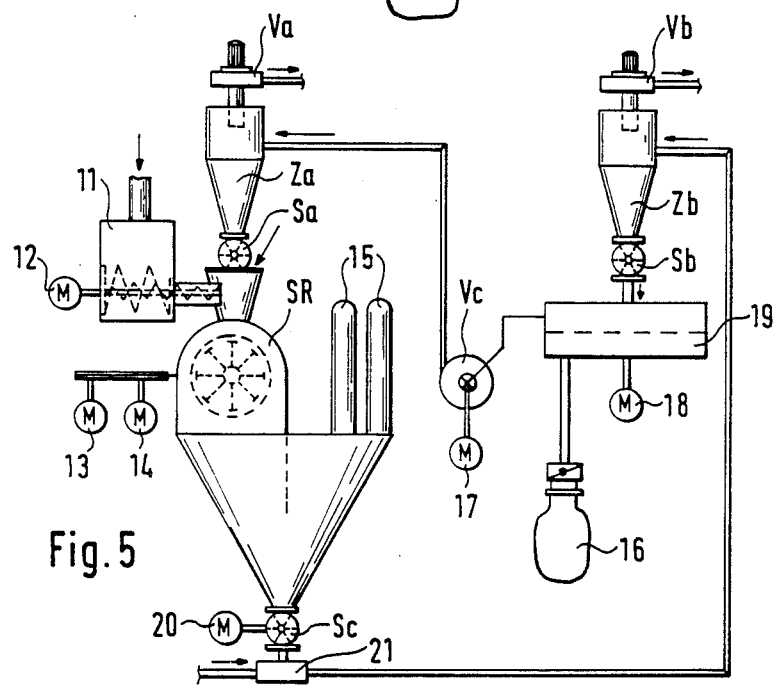
FIG. 5 shows a system for grinding and drying.

In FIG. 5, a unit with recycle is shown diagrammatically. In this figure, the symbols additionally to the parts already described represent:

Va–Vc fans
17 motor for fan Vc
Za and Zb cyclone separators
18 motor for screen 19
19 screen
Sa–Sc rotary vane locks
20 motor for rotary vane lock Sc
21 pneumatic conveyor installation

We claim:

1. A process for simultaneous grinding and drying of moist cellulose ethers, wherein
    (a) a moist cellulose ether is introduced by means of a transport gas into a circular space,
    (b) the moist cellulose ether is impact-comminuted while being circulated,
    (c) the product is simultaneously friction-comminuted in the direction opposite to that of the impact-comminution,
    (d) the peripheral speed of the impact and friction comminution, which operate in opposite directions, being regulated to such a value that the resulting grinding energy dries the product to a predetermined residual moisture content,
    (e) the ground material is conveyed onwards by the gas stream initially introduced into the circular space, and
    (f) the ground material is separated from the gas stream.

2. The process as claimed in claim 1, wherein the peripheral speed is 60 to 80 m/second in the impact comminution and 25 to 35 m/second in the friction comminution.

3. The process as claimed in claim 1, wherein the temperature generated by the comminution in opposite directions is reached by temperature adjustment of the transport gas for setting the desired degree of drying.

4. The process as claimed in claim 1, wherein the temperature generated by the comminution in opposite directions is controlled by additional temperature regulation within the circular space.

5. The process as claimed in claim 1 wherein the oversize of the ground material beyond a predetermined range is screened off.

6. The process as claimed in claim 1, wherein the impact comminution is effected by means of a beater wheel rotating in a housing, and the friction comminution is effected by means of a screen basket provided with friction segments and rotating in the opposite direction.

7. The process as claimed in claim 1, wherein a cellulose ether having an initial moisture content of 20 to 70% by weight is used.

8. The process as claimed in claim 1, wherein the impact comminution and friction comminution are adjusted such that the end product has a residual moisture content from 1 to 10% by weight.

9. The process as claimed in claim 1 in which the moist cellulose ether includes cellulose ethers from the group comprising the methylcelluloses, hydrdoxyethylcelluloses, hydroxypropylcelluloses and carboxymethylcelluloses as well as mixed ethers thereof.

10. The process as claimed in claim 1, wherein the ground material is subjected to selective screening after being separated from the gas stream.

11. The process as claimed in claim 1, wherein the moisture content of the cellulose ether is reached by moistening of the transport gas for setting the desired degree of drying.

12. The process as claimed in claim 1, wherein the temperature of the transport gas is controlled by additional temperature regulation within the circular space.

* * * * *